US012146627B1

(12) United States Patent
Xu et al.

(10) Patent No.: US 12,146,627 B1
(45) Date of Patent: Nov. 19, 2024

(54) LIGHT BODY CONNECTING STRUCTURE, LIGHT BODY, AND STRING LIGHT

(71) Applicant: JIANGMEN CITY SHENGDA LIGHTING CO., LTD., Jiangmen (CN)

(72) Inventors: Xiaojun Xu, Jiangmen (CN); Haiyan Xu, Jiangmen (CN); Caiju Sun, Jiangmen (CN)

(73) Assignee: JIANGMEN CITY SHENGDA LIGHTING CO., LTD., Jiangmen (CN)

( * ) Notice: Subject to any disclaimer, the term of this patent is extended or adjusted under 35 U.S.C. 154(b) by 0 days.

(21) Appl. No.: 18/409,731

(22) Filed: Jan. 10, 2024

(30) Foreign Application Priority Data

Dec. 4, 2023 (CN) ........................ 202323299478.2

(51) Int. Cl.

| | |
|---|---|
| ***F21S 4/10*** | (2016.01) |
| ***F21V 17/12*** | (2006.01) |
| ***F21V 19/00*** | (2006.01) |
| ***F21Y 107/30*** | (2016.01) |

(52) U.S. Cl.
CPC ................ *F21S 4/10* (2016.01); *F21V 17/12* (2013.01); *F21V 19/0005* (2013.01); *F21Y 2107/30* (2016.08)

(58) Field of Classification Search
None
See application file for complete search history.

(56) References Cited

U.S. PATENT DOCUMENTS

2021/0071833 A1* 3/2021 Hou ........................ F21V 29/70

* cited by examiner

*Primary Examiner* — Ashok Patel

(57) ABSTRACT

A light body connecting structure, a light body and a string light are provided. The light body connecting structure includes a wiring terminal and a wire. The wiring terminal includes a terminal body and at least one wiring plug. At least one mounting groove is defined on the terminal body for accommodating the at least one wiring plug. The terminal body is detachably connected to the lampshade. When the terminal body is to be connected to the lampshade, the at least one wiring plug is aligned with the opening of the lampshade. When the light body connecting structure is connected to the lampshade, the at least one wiring plug is disposed outside the opening and aligns with the opening, so a length of the light body is allowed to be long and light emitted by the light body is bright and uniform.

10 Claims, 17 Drawing Sheets

LIGHT BODY CONNECTING STRUCTURE, LIGHT BODY, AND STRING LIGHT

TECHNICAL FIELD

The present disclosure relates to a technical field of string light installations, and in particular to a light body connecting structure, a light body, and a string light.

BACKGROUND

A string light is a decorative lighting fixture made by stringing small bulbs together, which is usually used for holiday celebrations, indoor and outdoor decorations, party decorations, etc. The string light come in different colors, shapes and bulb types, such as colorful ball lights, flower-shaped lights, star lights, etc. People often hang string lights on trees, walls, or in indoor and outdoor spaces to create a warm, romantic or festive atmosphere.

In the prior art, the Chinese patent application No. CN202221840737.0 discloses an internally threaded lampshade connecting structure, a light body and a lamp string. Inner threads are disposed on openings of lampshades thereof, at least portions of terminals thereof are respectively inserted into the openings. Outer threads matched with the inner threads are disposed on each of the terminals. The terminals are respectively screwed with the openings of the lampshades, which facilitates assembly, disassembly, maintenance, and parts replacement of the string light.

Each of the lampshades in the above disclosure is integrally formed, and the internal threads are disposed on the openings of the lampshades. By screwing wire input ends and wire output ends of the terminals respectively into the opening of the lampshades, each of the light bodies in the lampshades is electrically connected. However, the terminals are unable to be connected to light bodies whose length are longer than a length of each of the lampshades, resulting in uneven light.

SUMMARY

In view of defects in the prior art, an object of the present disclosure is to provide a light body connecting structure applicable to a light body whose length is greater than a length of a lampshade. When the light body connecting structure is connected to the lampshade, exposed portions of the light body disposed outside openings of the lampshade align the openings of the lampshade. Therefore, when the length of the light body is greater than the length of the lampshade, the exposed portion of the light body disposed outside the openings are docked with a respective wiring plug outside the openings, so the length of the light body is capable of being made longer and light emitted by the light body is brighter and more uniform.

To achieve the above object, the present disclosure provides a light body connecting structure configured to be mounted on a lampshade. The light body connecting structure comprises a wiring terminal and a wire. The wiring terminal comprises a terminal body and at least one wiring plug. A size of the terminal body is greater than a size of an opening of the lampshade. At least one mounting groove is defined on a first end of the terminal body. The at least one wiring plug is fixedly disposed in the at least one mounting groove. The wire passes through a second end of the terminal body and is electrically connected with the at least one wiring plug. The terminal body is detachably connected to the lampshade. When the terminal body is to be connected to the lampshade, the at least one wiring plug is aligned with the opening of the lampshade.

Optionally, the wiring terminal further comprises a connecting piece matched with the opening of the lampshade. A first end of the connecting piece is connected with the first end of the terminal body. The at least one mounting groove of the terminal body penetrates the connecting piece. Outer threads are disposed on an outer side of the connecting piece. The outer threads are matched with the opening of the lampshade. The at least one wiring plug comprises a rotatable plug.

Optionally, two wiring plugs are provided. The two wiring plugs comprise a positive plug and a negative plug. A positive electrode and a negative electrode of the wire are respectively electrically connected to the positive plug and the negative plug. Two mounting grooves are provided. The positive plug and the negative plug are separately disposed in the mounting grooves.

Optionally, the terminal body, the at least one wiring plug, and the connecting piece are integrally formed by injection molding.

Optionally, hooking pieces are disposed on an outer end of the connecting piece. A hooking end of each of the hooking pieces protrudes with respect to the outer threads of the connecting piece, so that when the connecting piece is completely screwed into the opening of the lampshade, the hooking end of each of the hooking pieces hooks on an outer side of an inner port of the opening.

Optionally, the terminal body is in a frustum shape. Countersunk holes are defined in two sides of the terminal body. Bolts respectively pass through the countersunk holes of the terminal body to screw with the opening of the lampshade.

Based on the same inventive concept, the present disclosure further provides a light body. The light body comprises a light-emitting body, a lampshade, and at least one light body connecting structure mentioned above. The light-emitting body comprises a light-emitting piece. At least one power connecting plug is fixedly disposed on the light-emitting piece. The at least one wiring plug is matched with the at least one power connecting plug. The lampshade comprises a lampshade body. An accommodating cavity is defined in the lampshade body. At least one opening is defined on the lampshade body. The at least one opening is communicated with the accommodating cavity. The light-emitting body is capable of being placed into the accommodating cavity from the at least one opening. A quantity of the at least one power connecting plug disposed on the light-emitting piece is matched with a quantity of the at least one opening of the lampshade. The at least one opening of the lampshade body is connected with the at least one light body connecting structure. The light-emitting body is arranged in the lampshade, and the at least one power connecting plug of the light-emitting body is plugged into the at least one light body connecting structure, so that the light-emitting body is fixedly arranged in the lampshade and is electrically connected with the at least one light body connecting structure.

Optionally, power connecting plugs are provided. Light body connecting structures are provided. Openings are defined on the lampshade. The power connecting plugs are respectively disposed on two ends of the light-emitting piece. A length of the light-emitting body from a power connecting plug disposed on a first end of the light-emitting body to a second power connecting plug disposed on a second end of the light-emitting body is greater than a length of the lampshade, so the light body connecting structures are respectively docked with the power connecting plugs outside the lampshade. An exposed portion of each of the power connecting plugs outside the lampshade is plugged into a corresponding light body connecting structure of the light body connecting structures.

Optionally, the lampshade body comprises at least one stepped groove. The at least one opening is defined in a middle of the at least one stepped groove. A size of the at least one stepped groove is matched with the terminal body of the at least one light body connecting structure. An outer end of the at least one opening defines a chamfer. Inner threads are disposed on the at least one opening. The inner threads of the at least one opening are matched with the connecting piece of the at least one light body connecting structure.

Optionally, the light-emitting piece comprises a circuit board and lamp beads uniformly distributed on the circuit board.

Based on the same inventive concept, the present disclosure further provides a string light. The string light comprises at least two light bodies mentioned above. The at least one light body connecting structure of each of the at least two light bodies is connected to the at least one light body connecting structure of an adjacent light body of the at least two light bodies through a corresponding wire, so that the at least two light bodies are connected in series to form the string light.

Based on the same inventive concept, the present disclosure further provides a curtain light. The curtain light comprises string lights mentioned above. Each lampshade of each of the string lights is connected to an adjacent lampshade of an adjacent string light through a wire rod or a support rod.

Compared with the prior art, in the light body of the present disclosure, the light body connecting structures are suitable for the light body where the length of the light-emitting body is greater than the length of the lampshade thereof. When the light body connecting structures are connected to the lampshade, each wiring plug is disposed outside a corresponding opening of the openings of the lampshade and aligns the corresponding opening of the lampshade. Therefore, when the length of the light body is greater than the length of the lampshade, the exposed portion of each of the power connecting plugs of the light body disposed outside a corresponding opening is plugged into the corresponding wiring plug outside the corresponding opening, so the length of the light body is capable of being made longer and light emitted by the light body is brighter and the light emitted from the lampshade is more uniform.

Particularly, when mounting the light-emitting body in the lampshade, the exposed portion of each of the power connecting plugs outside the lampshade is plugged into the corresponding light body connecting structure of the light body connecting structures, then the light body connecting structures, are respectively connected with the lampshade. While during assembling a conventional light body, a first light body connecting structure thereof is docked with a light-emitting body thereof, the light-emitting body is inserted into a lampshade thereof from a first opening, a wiring plug of a second light body connecting structure is docked with the light body in the lampshade, and then the second light body connecting structure is fixed to a second opening of the lampshade. Compared with the conventional light body, each wiring plug of each of the light body connecting structures is no need to insert into the lampshade fort docking with the light-emitting body, and a user is able to connect the light body connecting structures respectively with two ends of the light-emitting body. Then, the light body connecting structures are fixed to the lampshade. Therefore, mounting is more convenient. Further, the present disclosure avoids a case that when the light boy connecting structures are detached from the light-emitting body of the conventional light body, the light-emitting body is easily stuck in the lampshade and is difficult to remove.

Particularly, each wiring plug is disposed on an outer side of each of the light body connecting structure, and each wiring plug is no need to insert into the corresponding opening of the lampshade, so he lampshade is allowed to be made smaller, and the openings of the lampshade are allowed to be made smaller to maintain an integrity of the lampshade.

According to the light body connecting structure of the present disclosure, the at least one wiring plug may be the rotatable plug, and may be screwed with the at least one opening of the lampshade. The terminal body comprises the connecting piece that is integrally formed with the terminal body, and the at least one mounting groove penetrates the connecting piece, so that the at least one wiring plug is completely docked with a corresponding power connecting plug of the light-emitting body while the connecting piece is completely screwed with the at least one opening of the lampshade.

Particularly, when the at least one opening is defined on the lampshade, since the size of the terminal body is greater than the size of the at least one opening of the lampshade, when the connecting piece is completely screwed into the at least one opening of the lampshade, the terminal body abuts against an outer end surface of the at least one opening of the lampshade to limit a position of the terminal body, so as to prevent excessive screwing-in of the connecting piece. The terminal body also serves as a sealing piece configured to seal the outer end surface of the at least one opening of the lampshade, making service life of the light body longer in outdoor environment.

Particularly, a length of the internal threads of the at least one opening of the lampshade is allowed to be shorter, so that light blocking at positions close to the at least one opening of the lampshade is reduced, and the light emitted from the lampshade is more uniformly.

In the light body of the present disclosure, under a condition that the wiring plug is aligned with the at least one opening of the lampshade, since the size of the terminal body is greater than the size of the at least one opening of the lampshade, two sides of the terminal body maybe detachably connected to the lampshade through the bolts. A connection method of the terminal body is more complex than a threaded connection method, but production cost of the terminal body is lower. The string light including such light bodies is allowed to be connected to high voltage. The positive plug and the negative plug of each of the light body connecting structures are respectively disposed in the two mounting grooves thereof, and the positive plug is separated from the negative plug of each of the light body connecting structures, so as to avoid a breakdown phenomenon between each positive plug and the negative plug of each of the light body connecting structures in a high-voltage state. For instance, the at least one wiring plug of each of the light body connecting structures that is the rotatable plug is unable to be used under high voltage.

In the light body connecting structure of the present disclosure, the terminal body, the at least one wiring plug, and the connecting member are integrally formed by injection molding, so production is more convenient. The terminal body is in the frustum shape, a large end surface of the terminal body is connected to the lampshade, and a small end surface of the terminal body is connected to the wire. When the light body connecting structure is connected to the lampshade, a size thereof from the lampshade to the wire looks large to small and a shape thereof transitions smoothly. Moreover, the at least one wiring plug is accommodated in a middle of an interior of the terminal body, and countersunk holes configured to connect to the bolts are defined on the two sides of the terminal body.

1—wiring terminal; 11—terminal body; 111—mounting groove; 112—countersunk hole; 12—wiring plug; 12*a*—positive plug; 12*b*—negative plug; 13—connecting piece; 131—hooking piece; 131*a*—V-shaped protrusion; 131*b*—elastic piece; 2—wire; 3—light-emitting body; 31—light-emitting piece; 311—circuit board; 312—lamp bead; 313—light strip; 314—support bracket; 32—power connecting plug; 4—lampshade; 41—lampshade body; 411—accommodating cavity; 412—opening; 4121—chamfer; 412*a*—wiring input opening; 412*b*—wiring output opening; 413—stepped groove; 5—electrical plug; 6—three-way joint.

DETAILED DESCRIPTION

In order to enable those skilled in the art to better understand the technical solutions in the present disclosure, technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Embodiments

The present disclosure aims to solve problems of the Chinese patent application No. CN202221840737.0 in the prior art, which discloses an internally threaded lampshade connecting structure, a light body and a lamp string. In the mentioned CN application, each of the lampshades is integrally formed, and internal threads are disposed on openings of the lampshades. By screwing wire input ends and wire output ends of the terminals respectively into the opening of the lampshades, each of the light bodies in the lampshades is electrically connected. However, the terminals are unable to be connected to light bodies whose length are longer than a length of each of the lampshades, resulting in uneven light.

To solves the problems in the prior art, the present disclosure provides a light body connecting structure applicable to a light body whose length is greater than a length of a lampshade. When the light body connecting structure is connected to the lampshade, exposed portions of the light body disposed outside openings of the lampshade align the openings of the lampshade. Therefore, when the length of the light body is greater than the length of the lampshade, the exposed portion of the light body disposed outside the openings are docked with a respective wiring plug outside the openings, so the length of the light body is capable of being made longer and light emitted by the light body is brighter and more uniform.

Figure 1:
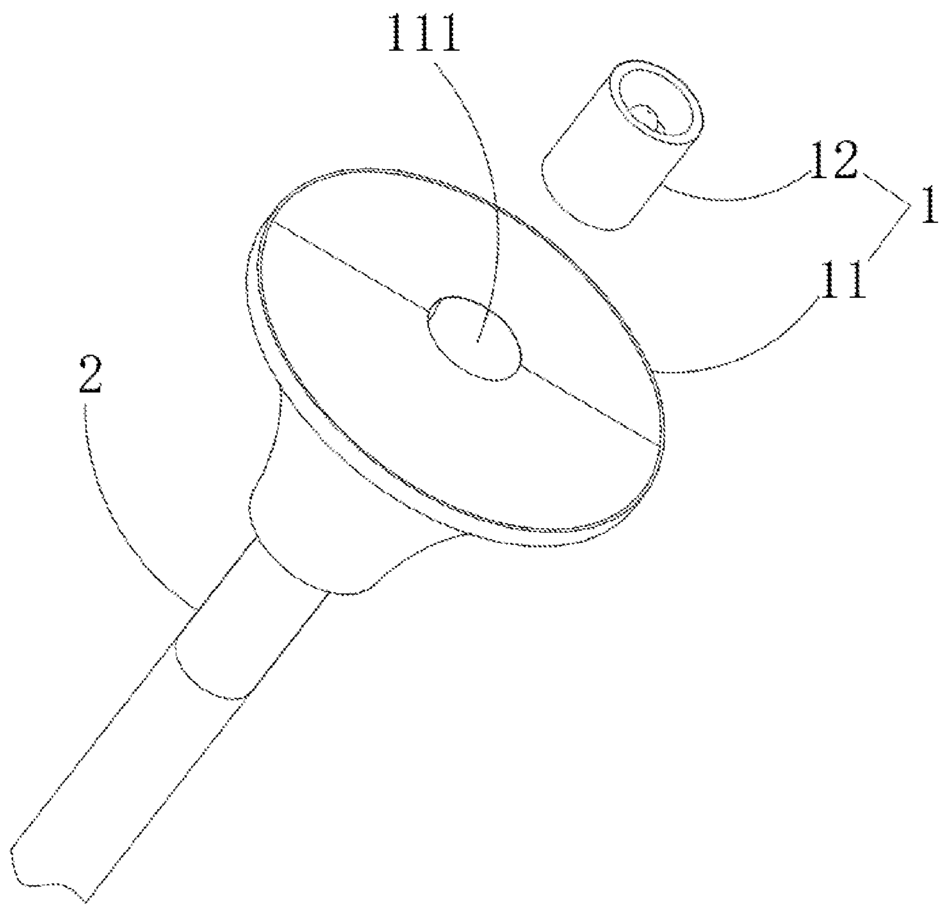
FIG. 1 is an exploded schematic diagram of a first embodiment of a light body connecting structure according to one embodiment of the present disclosure.

As shown in FIG. 1, the present disclosure provides a light body connecting structure configured to be mounted on a lampshade 4. The light body connecting structure comprises a wiring terminal 1 and a wire 2. The wiring terminal 1 comprises a terminal body 11 and at least one wiring plug 12. A size of the terminal body 11 is greater than a size of an opening 412 of the lampshade 4. At least one mounting groove 111 is defined on a first end of the terminal body 11. The at least one wiring plug 12 is fixedly disposed in the at least one mounting groove 111. The wire 2 passes through a second end of the terminal body 11 and is electrically connected with the at least one wiring plug 12. The terminal body is detachably connected to the lampshade 4. When the terminal body 11 is to be connected to the lampshade 4, the at least one wiring plug 12 is aligned with the opening 412 of the lampshade 4.

Figure 2:
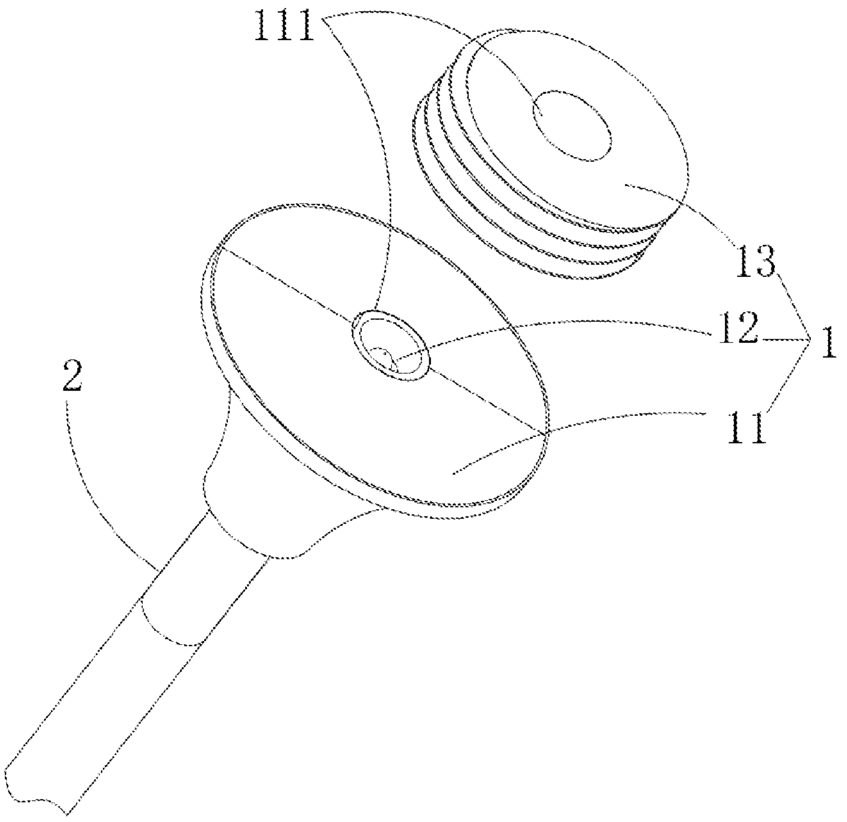
FIG. 2 is an exploded schematic diagram of a second embodiment of the light body connecting structure according to one embodiment of the present disclosure.

In some embodiments, as shown in FIG. 2, the wiring terminal 1 further comprises a connecting piece 13 matched with the opening 412 of the lampshade 4. A first end of the connecting piece 13 is connected with the first end of the terminal body 11. The at least one mounting groove 111 of the terminal body 11 penetrates the connecting piece 13. Outer threads are disposed on an outer side of the connecting piece 13. The outer threads are matched with the opening 412 of the lampshade 4. The at least one wiring plug comprises a rotatable plug.

It is understood that the terminal body 11 and the connecting piece 13 may be integrally formed. The at least one mounting groove 111 penetrates the connecting piece 13, so that a light-emitting body 3 is allowed to insert into the at least one wiring plug 12 through the at least one mounting groove. Alternatively, the connecting piece 13 and the terminal body 11 may be two independent workpieces that are detachably connected. A middle portion of the connecting piece 13 defines at least one hole having a size that is same as or greater than the at least one mounting groove 111 of the terminal body 11. It should be noted that when the wiring terminal 1 is screwed with the lampshade, there may be only one wiring plug, and the wiring plug is the rotatable plug. The rotatable plug may be a male plug or a female plug matched with the light body. The rotatable plug may be a headphone plug, a direct current (DC) plug, an audio plug, and other plug having a cylindrical connector to support, fix, and electrically connect with the light body 31. During a plugging process, the male plug or the female plug of the rotatable plug is rotated arbitrarily while maintaining electrical connection of the female plug or the male plug.

Figure 3:
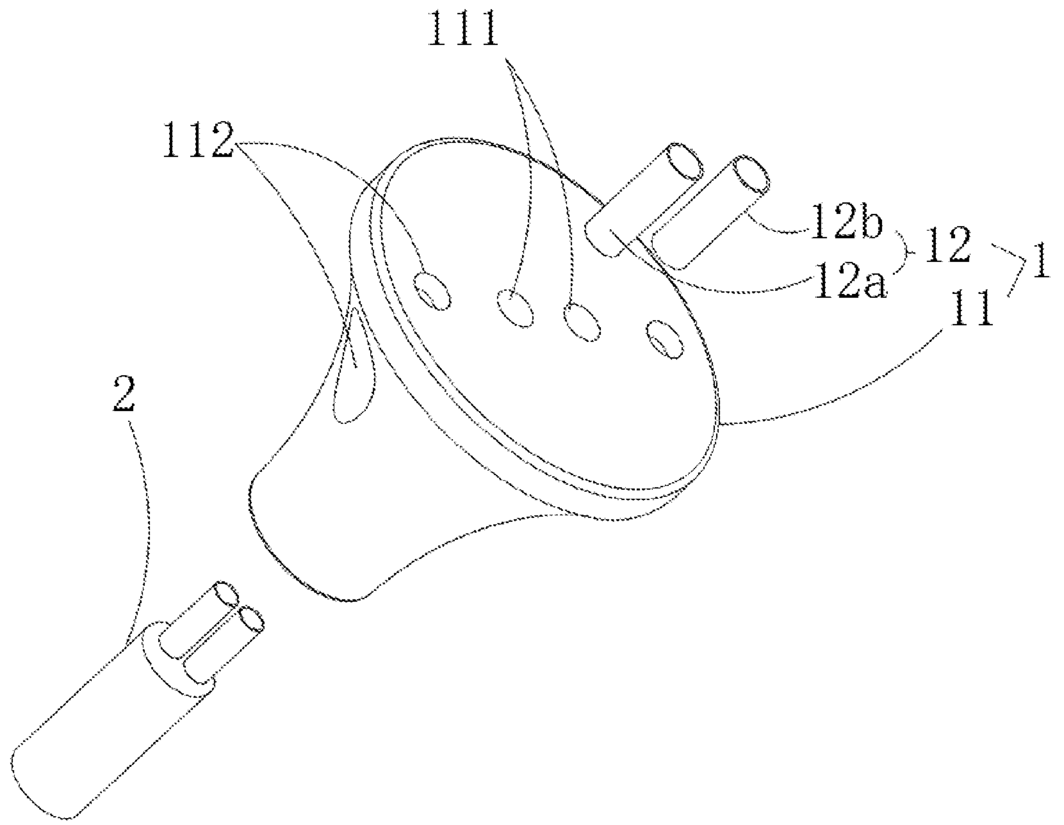
FIG. 3 is an exploded schematic diagram of a third embodiment of the light body connecting structure according to one embodiment of the present disclosure.

The rotatable plug is unable to be used under high voltage, or a breakdown phenomenon easily occurs. Therefore, in some embodiments, as shown in FIG. 3, two wiring plugs 12 are provided. The two wiring plugs 12 comprise a positive plug 12*a* and a negative plug 12*b*. A positive electrode and a negative electrode of the wire 2 are respectively electrically connected to the positive plug 12*a* and the negative plug 12*b*. Two mounting grooves 111 are provided. The positive plug 12*a* is disposed in a first one of the mounting grooves, and the negative plug 12*b* is disposed in a second one of the mounting groove 111. The positive plug 12*a* and the negative plug 12*b* are separately disposed in the mounting grooves 111. The positive plug is separated from the negative plug of the light body connecting structure, so when high-voltage current is connected, the positive plug 12*a* and the negative plug 12*b* have better insulation effect and better safety. Moreover, since the wring terminal 1 connected to the opening of the lampshade 4 is disposed outside the opening 412 of the lampshade 4, the opening 412 of the lampshade 4 is allowed to be smaller only if the corresponding light-emitting body 3 is allowed to pass through the opening 412 of the lampshade 4. When the wiring terminal 1 is connected to the lampshade 4, the two wiring plugs 12 are aligned with the opening 412, so that the light-emitting body 3 is aligned and docked with the two wiring plugs 12. The two wiring plugs 12 are cylindrical wiring sockets or metal power connecting bumps respectively disposed in the two mounting grooves 111. When power connecting plugs 32 of the light-emitting body 3 are respectively inserted into the two mounting grooves 111, the power connecting bumps respectively clamp on outer sides of the power connecting plugs 32 to create the electrical connection therein.

Figure 4:
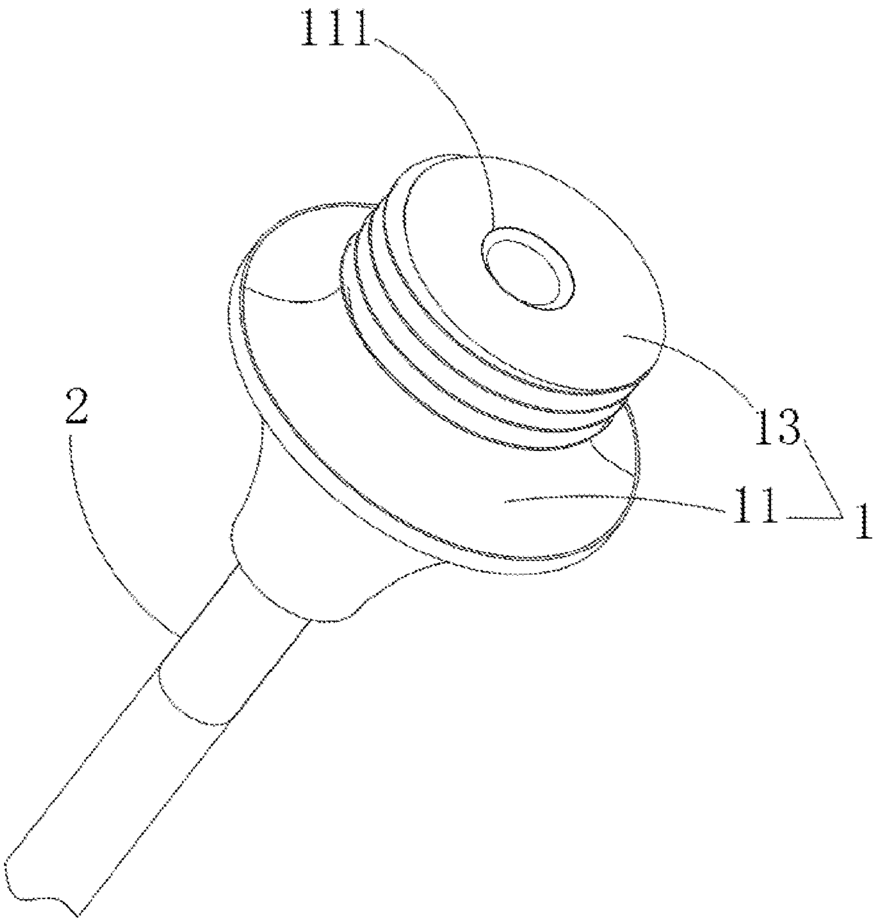
FIG. 4 is a perspective schematic diagram of the second embodiment of the light body connecting structure that is integrally formed according to one embodiment of the present disclosure.

To facilitate production, as shown in FIG. 4, in some embodiments, the terminal body 11, the at least one wiring plug 12, and the connecting piece 13 are integrally formed by injection molding.

Figure 5:
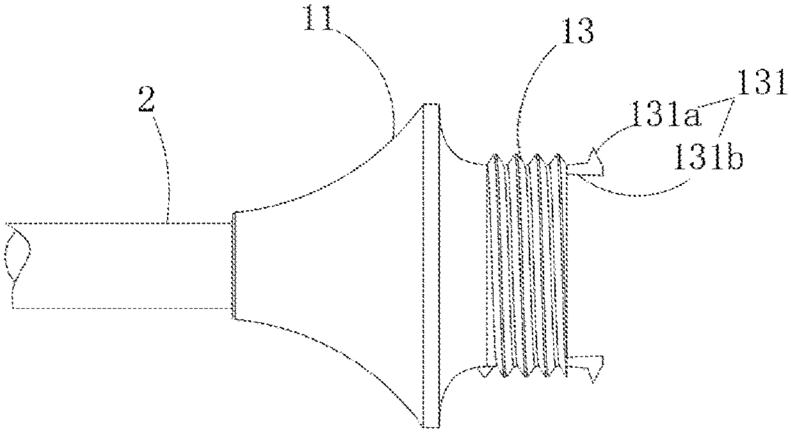
FIG. 5 is a schematic diagram of a fourth embodiment of the light body connecting structure with hooking pieces according to one embodiment of the present disclosure.
Figure 6:
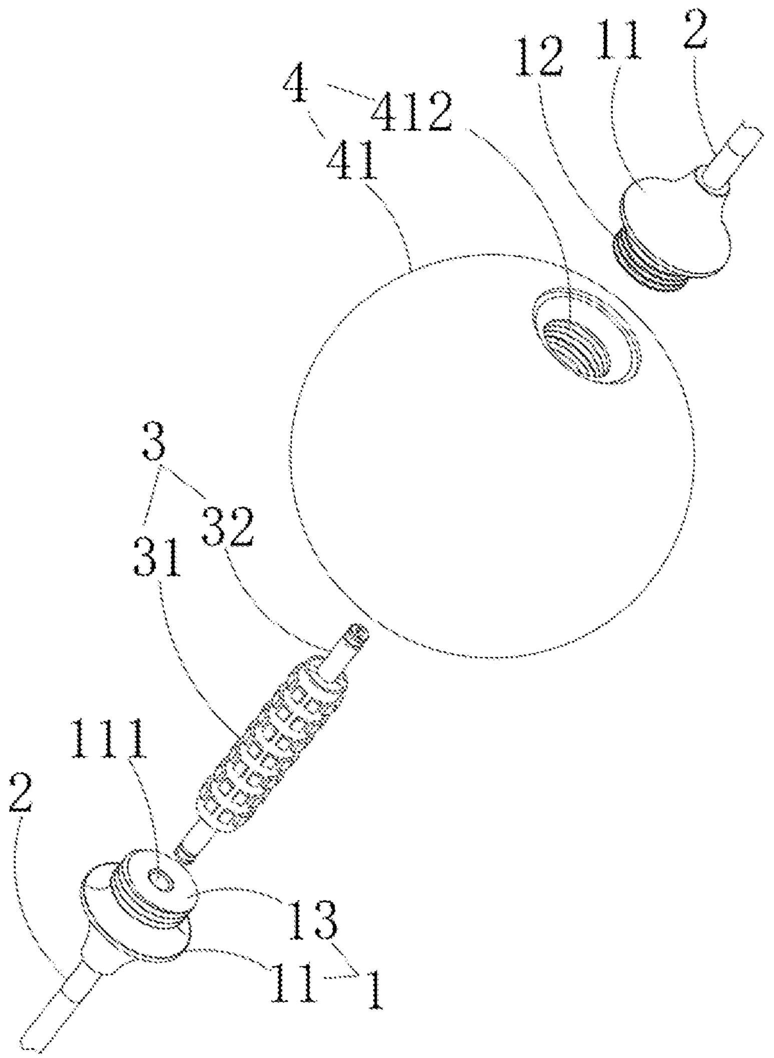
FIG. 6 is an exploded schematic diagram of a light body according to one embodiment of the present disclosure.

When the wiring terminal 1 is connected to the lampshade 4 through the outer threads, and when a string light having the same is hung outdoors, each wiring terminal 1 and a corresponding lampshade 4 are prone to loosening, affecting normal use of the string light. To solve the problem, in some embodiments, as shown in FIG. 5, hooking pieces 131 are disposed on an outer end of the connecting piece 13. A hooking end of each of the hooking pieces 131 protrudes with respect to the outer threads of the connecting piece 13, so that when the connecting piece 13 is completely screwed with the opening 412 of the lampshade 4, the hooking end of each of the hooking pieces 131 hooks on an outer side of an inner port of the opening 412. The hooking end of each of the hooking pieces 131 protrudes with respect to the outer threads of the connecting piece 13, and the hooking end of each of the hooking pieces 131 is a V-shaped protrusion 131*a*. Each V-shaped protrusion 131*a* is connected to an end surface of each of the connecting piece through an elastic piece 131*b*. During mounting, the user first presses each V-shaped protrusion 131*a* along a first beveled edge thereof into the internal threads of the opening 412 of the lampshade 4. At this time, each V-shaped protrusion 131*a* is pressed to causes each elastic piece 131*b* to elastically deform and shrink. When each V-shaped protrusion 131*a* rotates out of the inner port of the opening 412 of the lampshade 4, each elastic piece 131*b* elastically deforms and resets, driving each V-shaped protrusion 131*a* to hook to the inner port of the opening 412 of the lampshade 4, so a position of the wiring terminal 1 is limited and the wiring terminal 1 and the lampshade 4 are not easy to loosen. Similarly, the connecting piece 13 is allowed to be unscrewed along a second beveled edge of each V-shaped protrusion 131*a* under greater force of the user.

In some embodiments, as shown in FIG. 3, the terminal body 11 is in a frustum shape. Countersunk holes 112 are defined in two sides of the terminal body 11. Bolts respectively pass through the countersunk holes 112 of the terminal body 11 to screw with the opening 412 of the lampshade 4. The terminal body 11 is in the frustum shape, a large end surface of the terminal body 11 is connected to the lampshade 4, a small end surface of the terminal body 11 is connected to the wire 2. When the light body connecting structure is connected to the lampshade 4, a size thereof from the lampshade 4 to the wire 2 looks large to small and a shape thereof transitions smoothly. An outer side of the terminal body 11 is a concave arc surface, which makes transition smooth, makes the light body streamlined, and looks beautiful. Moreover, as shown in FIG. 5, the at least one wiring plug 12 is accommodated in a middle of an interior of the terminal body 11. Further, as shown in FIG. 3, when the terminal body is integrally formed, the terminal body 11 further defines a space for accommodating a section of the wire 2 welded to the at least one wiring plug 12. The countersunk holes 112 configured to connect to the bolts are defined on two sides of the large end surface of the terminal body 11, making a structure thereof reasonable.

As shown in FIGS. 6-11, the present disclosure further provides a light body. The light body comprises a light-emitting body 3, a lampshade 4, and at least one light body connecting structures mentioned above. The light-emitting body 3 comprises a light-emitting piece 31. At least one power connecting plug 32 is fixedly disposed on the light-emitting piece 31. The at least one wiring plug 12 is matched with the at least one power connecting plug 32. The lampshade 4 comprises a lampshade body 41. An accommodating cavity 411 is defined in the lampshade body, At least one openings 412 is defined on the lampshade body 41. The at least one opening 412 is communicated with the accommodating cavity. The light-emitting body is capable of being placed into the accommodating cavity 411 from the at least one opening 412. A quantity of the at least one power connecting plug 32 disposed on the light-emitting piece 31 is matched with a quantity of the at least one opening 412 of the lampshade 4. The at least one opening 412 of the lampshade body 41 is connected with the at least one light body connecting structure. The light-emitting body 3 is arranged in the lampshade 4, and the at least one power connecting plug 32 of the light-emitting body 3 is docked with the at least one light body connecting structure, so that the light-emitting body 3 is fixedly arranged in the lampshade 4 and is electrically connected with the at least one light body connecting structure. The lampshade 4 comprises the lampshade body 41 that is integrally formed. When openings are defined on the lampshade body 41, the openings 412 may comprise a wiring input opening 412*a* and a wiring output opening 412*b*. The wiring input opening 412*a* and the wiring output opening 412*b* are communicated with the accommodation cavity 411.

Figure 7:
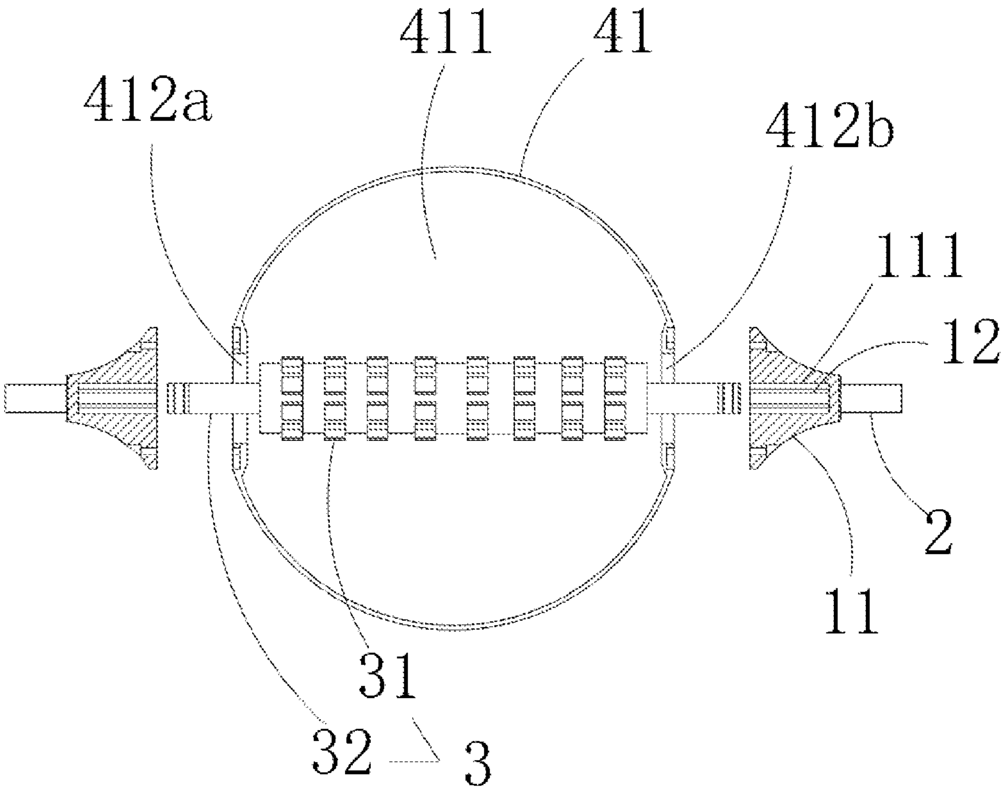
FIG. 7 is a cross-sectional elevational diagram of a first embodiment of the light body according to one embodiment of the present disclosure.
Figure 8:
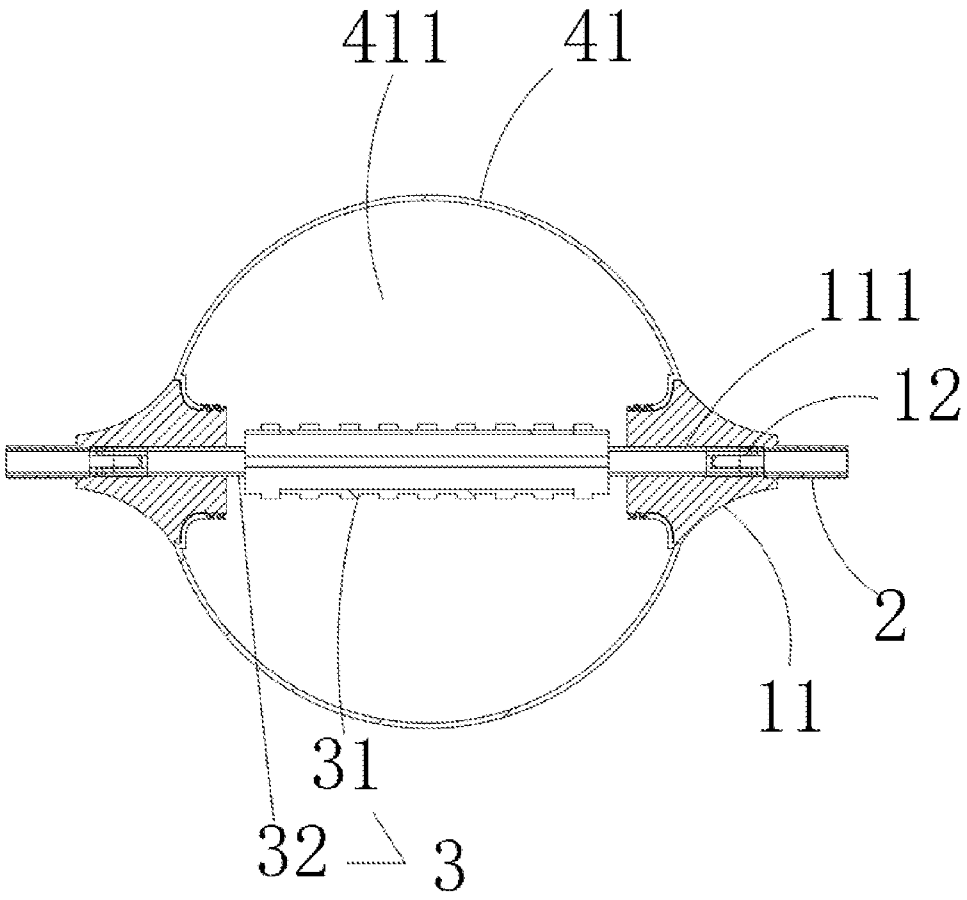
FIG. 8 is a cross-sectional elevational diagram of a second embodiment of the light body according to one embodiment of the present disclosure.
Figure 9:
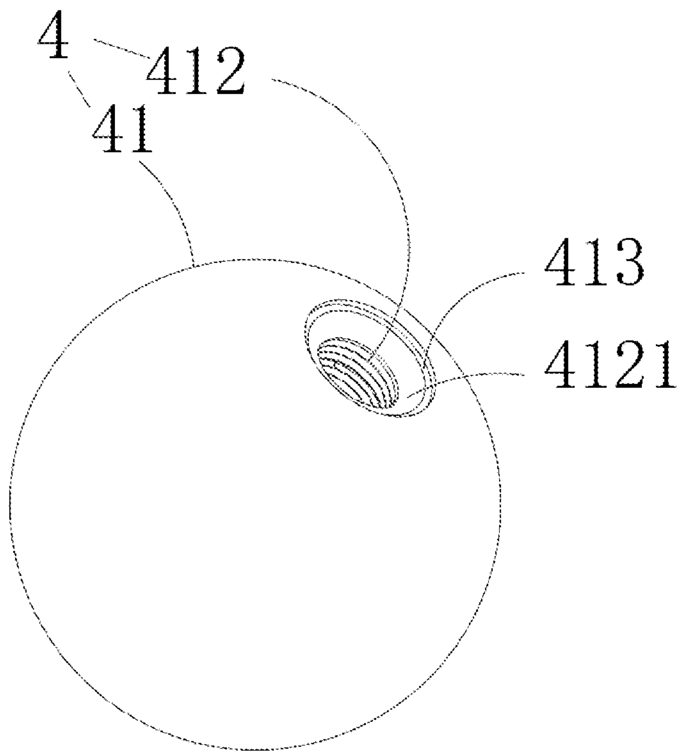
FIG. 9 is a schematic diagram of a lampshade according to one embodiment of the present disclosure.

Specifically, as shown in FIGS. 7 and 8, power connecting plugs 32 are disposed on two ends of the light-emitting piece 31 and two light body connecting structures are provided. A length of the light-emitting body 3 from a power connecting plug disposed on a first end of the light-emitting body to a second power connecting plug disposed on a second end of the light-emitting body is greater than a length of the lampshade 4, so the light body connecting structures are respectively docked with the power connecting plugs 32 outside the lampshade 4. An exposed portion of each of the power connecting plugs outside the lampshade is plugged into a corresponding light body connecting structure of the light body connecting structures In some embodiments, as shown in FIG. 9, the lampshade body 41 comprises at least one stepped groove 413. The at least one opening 412 is defined in a middle of the at least one stepped groove 413. A size of the at least one stepped groove 413 is matched with the terminal body 11 of the at least one light body connecting structure. An outer end of the at least one opening 412 defines a chamfer 4121. The chamfer 4121 is an arc chamfer. Inner threads are disposed on the at least one opening 412. The inner threads of the at least one opening 412 are matched with the connecting piece of the at least one light body connecting structures. It should be noted that the at least one stepped groove 413 is to facilitate connection between the large end surface of the terminal body 11 and the lampshade 4, so that the connection point thereof is flush with a surface of the lampshade 4, thereby maintaining the an aesthetic appearance of the light body.

Figure 10:
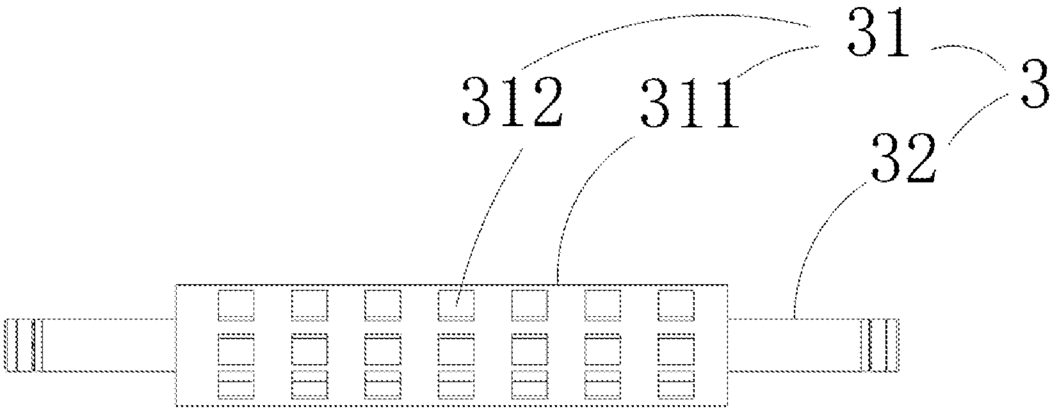
FIG. 10 is a schematic diagram of a first embodiment of a light-emitting body according to one embodiment of the present disclosure.

In some embodiments, as shown in FIG. 10, the light-emitting piece 31 comprises a circuit board 311 and lamp beads 312 uniformly distributed on the circuit board 311. The lamp beads 312 are electrically connected to the circuit board. When two power connecting plugs 32 are disposed on the light-emitting piece 31 and two openings 412 are defined on the lampshade body 41, the two power connecting plugs 32 comprise an input plug and an output plug. The input plug and the output plug are respectively electrically connected to a current input end and a current output end of the circuit board 31. The input plug and the output plug are welded on the circuit board 311 respectively. When the light-emitting body 3 is arranged in the lampshade 4, the input plug and the output plug respectively correspond to the wiring input opening 412*a* and the wiring output opening 412*b* of the lampshade 4.

Figure 11:
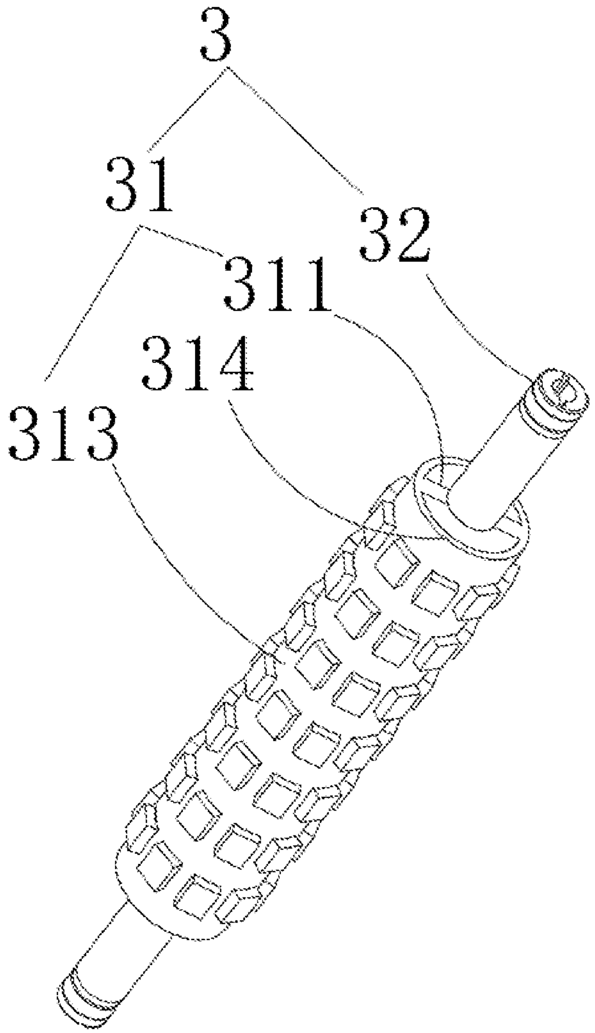
FIG. 11 is a schematic diagram of a second embodiment of the light-emitting body according to one embodiment of the present disclosure.

In some embodiments, as shown in FIG. 11, the light-emitting piece 5 comprises a light strip 33 and a support bracket 314. The light strip 33 is wrapped on an outer side of the support bracket 314. It should be noted that the light strip 33 comprises small bulbs or LED lamps that are uniformly distributed, and has a soft and flexible external material, such as a rubber sleeve or a plastic sleeve. The light strip 33 comprises a self-adhesive backing adhesive, which allows the light strip 33 being conveniently adhered to the support bracket 314.

Specifically, the support bracket 314 is hollow, the circuit board 311 is disposed inside the support bracket 314; and the circuit board 311 is electrically connected to the light strip 313. The power connecting plugs 32 are fixed at two ends of the circuit board 311. The current input end and the current output end of the circuit board 311 are respectively electrically connected to the power connecting plugs 32. It should be added that the support bracket 314 is in a cylindrical shape, the light strip 313 is wrapped on the outer side of the support bracket 341. The circuit board 311 is accommodated inside support bracket 341.

Figure 12:
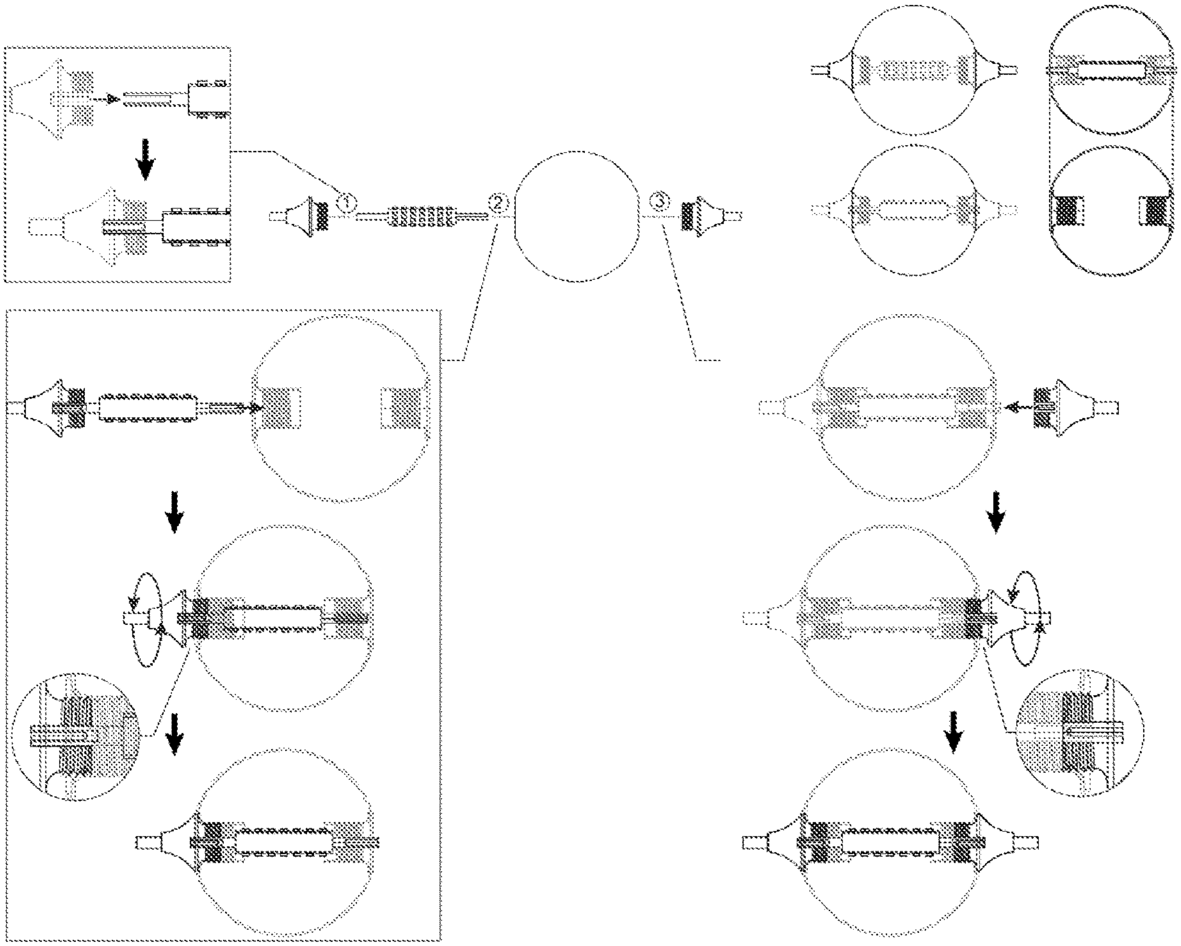
FIG. 12 is a schematic diagram of an assembling method of the light body according to one embodiment of the present disclosure, where the light body is assembled through threads.

As shown in FIG. 12, an assembling method of the light body assembled through threads comprises:

- a step S1: docking a first light body connecting structure with the first end of the light-emitting body 3;
- a step S2: inserting the light-emitting body 3 into the lampshade 4 from a first opening 412, and screwing the first light body connecting structure with the first opening 412 of the lampshade 4, and
- a step S3: enabling the second end of the light-emitting body 3 being extended out of a second opening 412 of the lampshade 4, docking the at least one wiring plug 12 of a second light body connecting structure with the second end of the light-emitting body 3, and screwing the second light body connecting structure with the second opening 412 of the lampshade 4 to enable the at least one wiring plug 12 of the second light body connecting structure being completely docked with the second end of the light-emitting body 3.

Figure 13:
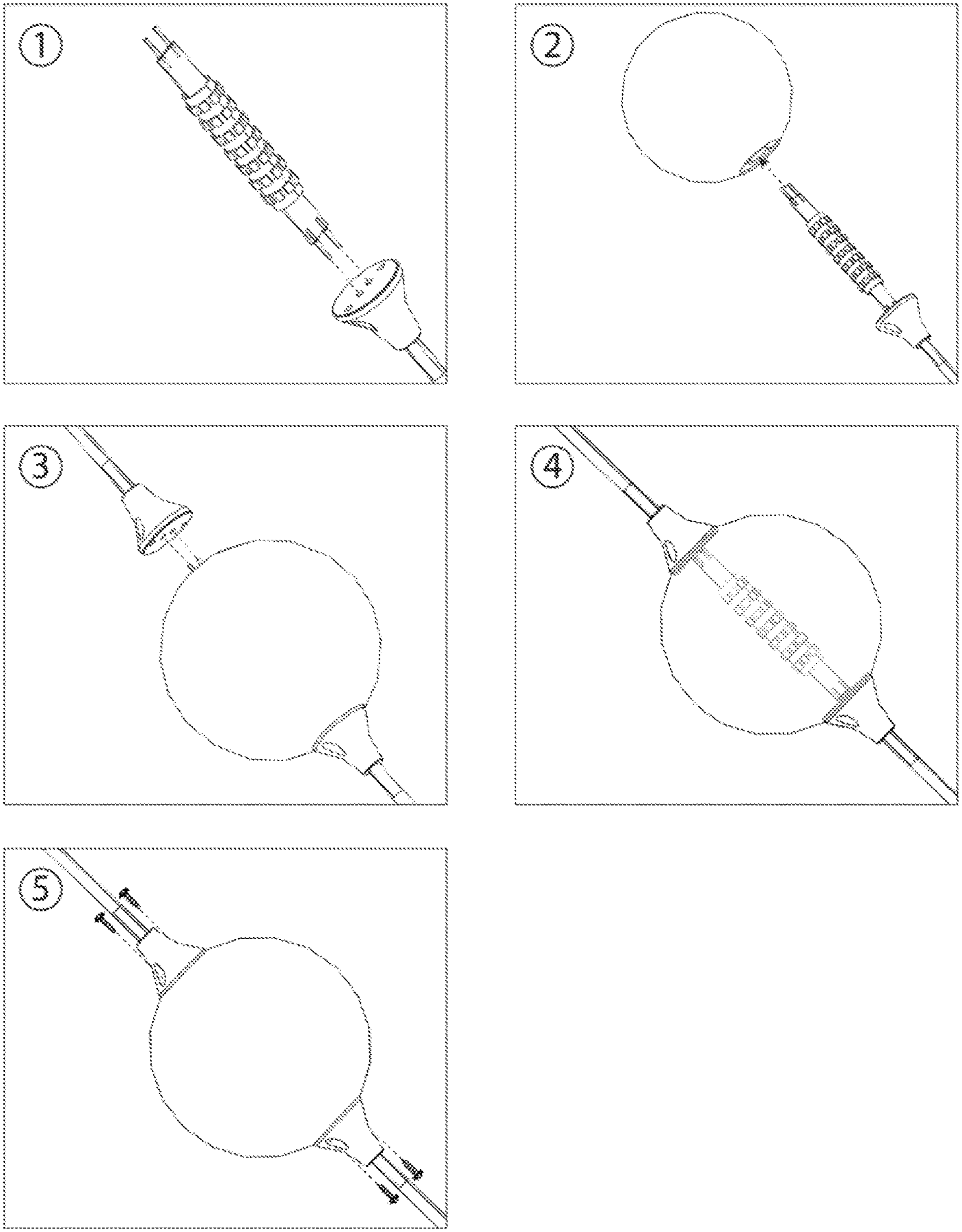
FIG. 13 is a schematic diagram of another assembling method of the light body according to one embodiment of the present disclosure, where the light body is assembled through bolts.

As shown in FIG. 13, an assembling method of the light body assembled through the bolts comprises:

- a step S1: docking a first light body connecting structure with the first end of the light-emitting body 3;
- a step S2: inserting the light-emitting body 3 into the lampshade 4 from a first opening 412,
- a step S3: aligning the first light body connecting structure with a first mounting position of the lampshade 4, and
- a step S4: enabling the second end of the light-emitting body 3 being extended out of a second opening 412 of the lampshade 4, docking the at least one wiring plug 12 of a second light body connecting structure with the second end of the light-emitting body 3; and a step S5: fixing the first light body connecting structure and the second light body connecting structure on the lampshade through the bolts to enable the at least one wiring plug 12 of the second light body connecting structure being completely docked with the second end of the light-emitting body 3.

Figure 14:
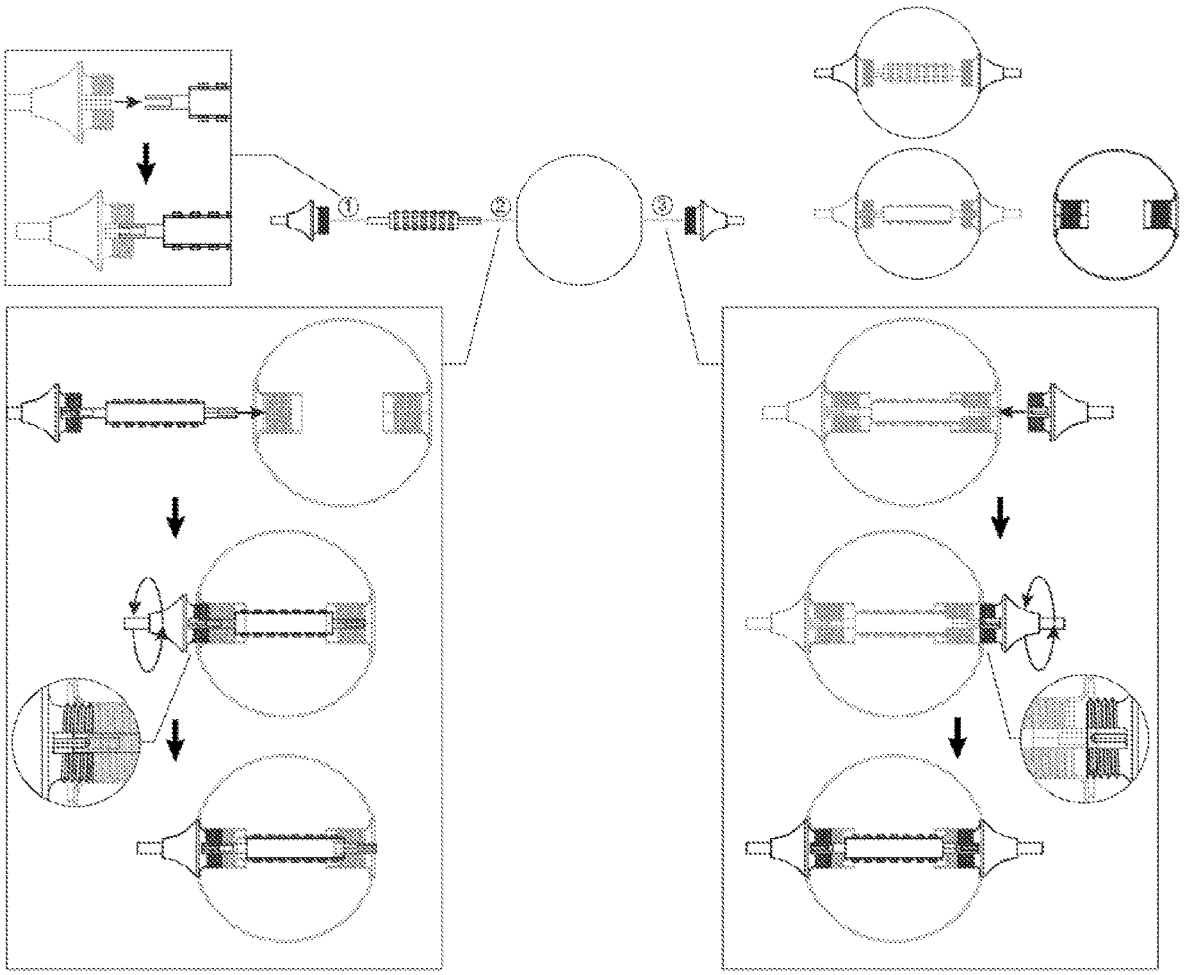
FIG. 14 is a schematic diagram of another assembling method of the light body according to one embodiment of the present disclosure, where a length of the light-emitting body is equal to a distance between two opening of the lampshade.

As shown in FIG. 14, the assembling method of the present disclosure may be applied to the light-emitting body 3 whose length is not greater than a distance between the two openings of the lampshade 4, and each wiring plug 12 needs to extend into a corresponding connecting piece 13. For instance, when the light-emitting body 3 with the length equal to the distance between the two openings of the lampshade 4 is adopted, and the assembling method thereof comprises:

- a step S1: incompletely docking a first light body connecting structure with the first end of the light-emitting body 3 to define a docking stoke;
- a step S2: inserting the light-emitting body 3 into the lampshade 4 from a first opening 412, and screwing the first light body connecting structure with the first opening 412 of the lampshade 4, and
- a step S3: enabling the second end of the light-emitting body 3 being flush with a second opening 412 of the lampshade 4, docking the at least one wiring plug 12 of a second light body connecting structure with the second end of the light-emitting body 3, and screwing the second light body connecting structure with the second opening 412 of the lampshade 4 to enable the at least one wiring plug 12 of the second light body connecting structure being completely docked with the second end of the light-emitting body 3.

Figure 15:
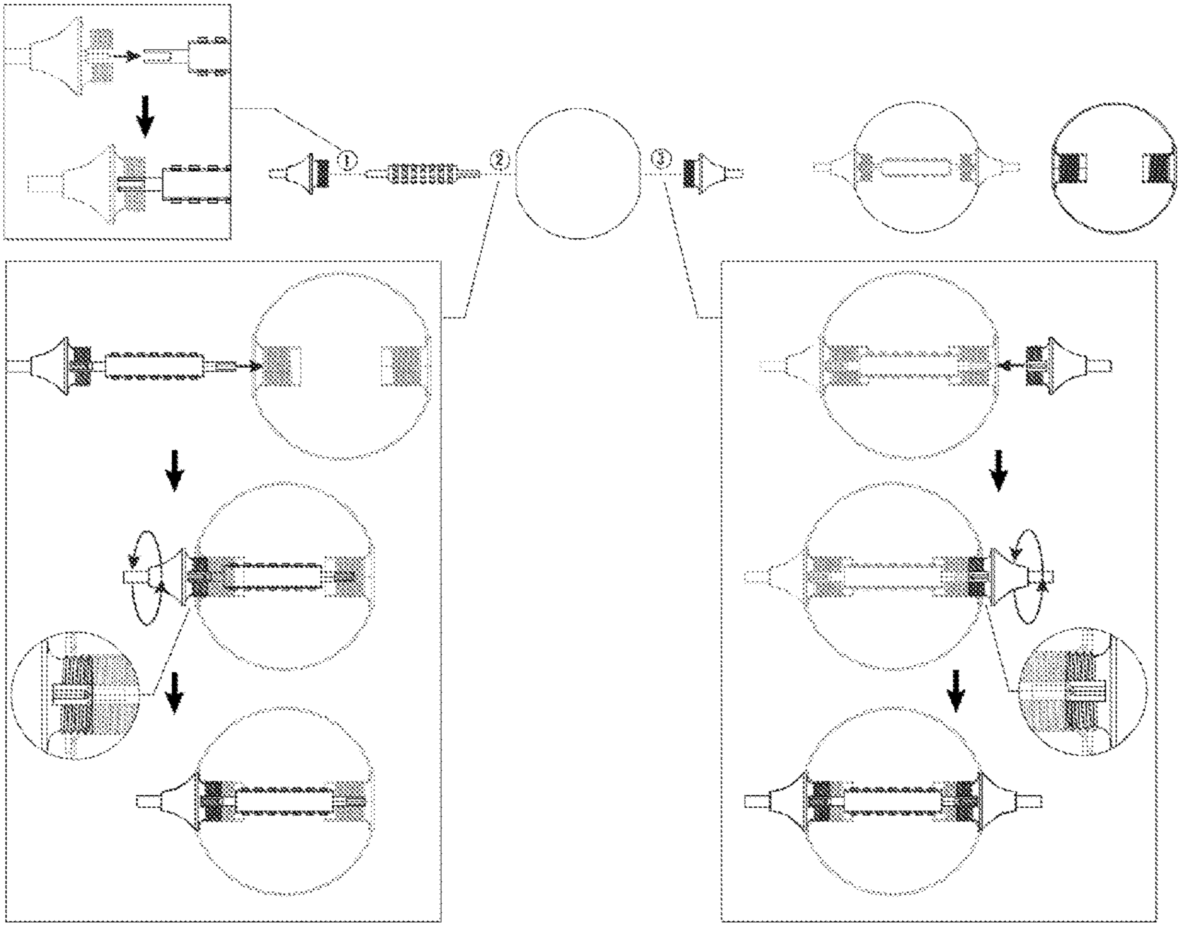
FIG. 15 is a schematic diagram of another assembling method of the light body according to one embodiment of the present disclosure, where the length of the light-emitting body is greater than the distance between the two opening of the lampshade.

As shown in FIG. 15, the assembling method of the present disclosure may be applied to the light-emitting body 3 whose length is not greater than a distance between the two openings of the lampshade 4, and each wiring plug 12 needs to extend into a corresponding connecting piece 13. For instance, when the light-emitting body 3 with the length equal to the distance between the two openings of the lampshade 4 is adopted, and the assembling method thereof comprises:

- a step S1: completely docking a first light body connecting structure with the first end of the light-emitting body 3;
- a step S2: inserting the light-emitting body 3 into the lampshade 4 from a first opening 412, and screwing the first light body connecting structure with the first opening 412 of the lampshade 4, and
- a step S3: enabling the second end of the light-emitting body 3 being flush with a second opening 412 of the lampshade 4, docking the at least one wiring plug 12 of a second light body connecting structure with the second end of the light-emitting body 3, adjusting the connecting structure 13 of second light body connecting structure in the chamfer 4121 of the second opening 412 of the lampshade 4 to enable the second light body connecting structure being aligned with the second end of the light-emitting body 3; and screwing the second light body connecting structure with the second opening 412 of the lampshade 4 to enable the at least one wiring plug 12 of the second light body connecting structure being completely docked with the second end of the light-emitting body 3, where each opening defines the chamfer 4121 and an outer diameter of each chamfer 4121 is greater than an outer diameter of each connecting piece 13.

Figure 16:
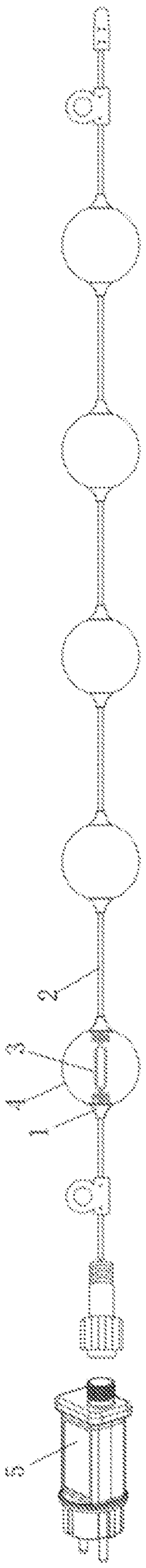
FIG. 16 is a schematic diagram of a first embodiment of a string light according to one embodiment of the present disclosure.
Figure 17:
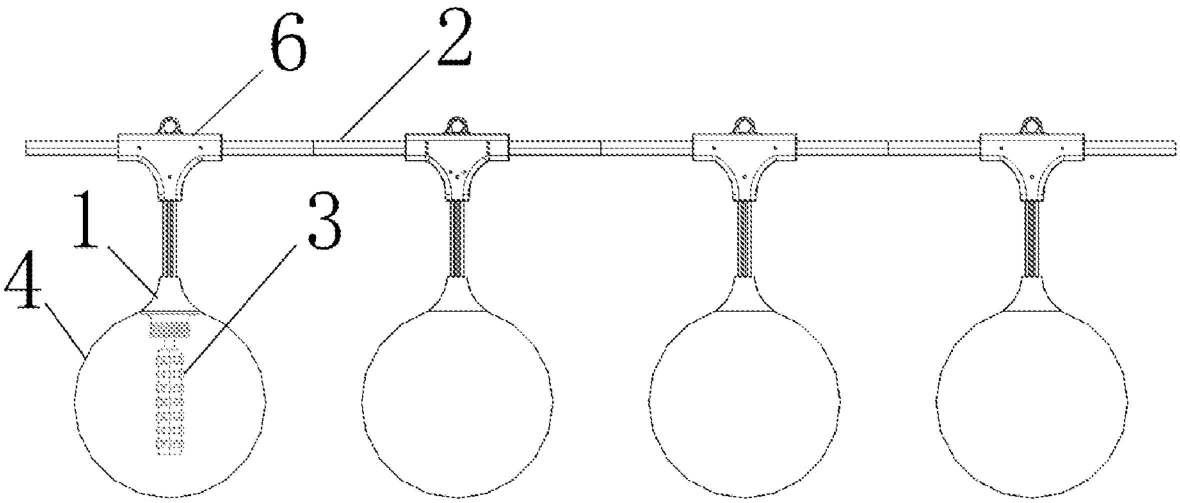
FIG. 17 is a schematic diagram of a second embodiment of the string light according to one embodiment of the present disclosure.

As shown in FIGS. 16 and 17, the present disclosure further provides a string light. The string light comprises at least two light bodies mentioned above. The at least one light body connecting structure of each of the at least two light bodies is connected to the at least one light body connecting structure of an adjacent light body of the at least two light bodies through a corresponding wire 2, so that the at least two light bodies are connected in series to form the string light.

As shown in FIG. 16, a structure of the string light is as follows: two openings symmetrically arranged are defined on each lampshade 4, and the light body connecting structures arranged opposite to each other of each two adjacent light bodies are connected through the corresponding wire 2, so that the light bodies are connected in series to form the string light. The string light further comprises an electrical plug 5, which is electrically connected to a last light body connecting structures disposed on a tail end of the string light through a last wire 2.

As shown in FIG. 17, an alternative structure of the string light is as follows: each lampshade 4 only defines one opening. The string light further comprises three-way joints 6. Each light-emitting body 3 defines one power plug. Each power plug 32 is the rotatable plug. A first connector and a second connector of each of the three-way joints 6 are respectively electrically connected to two adjacent three-way joints 6 through a corresponding wire 2, and a third connector of each of the three-way joints 6 is electrically connected to a corresponding light body. Similarly, each of the three-way joints 6 is connected to the corresponding light body to form the string light.

Figure 18:
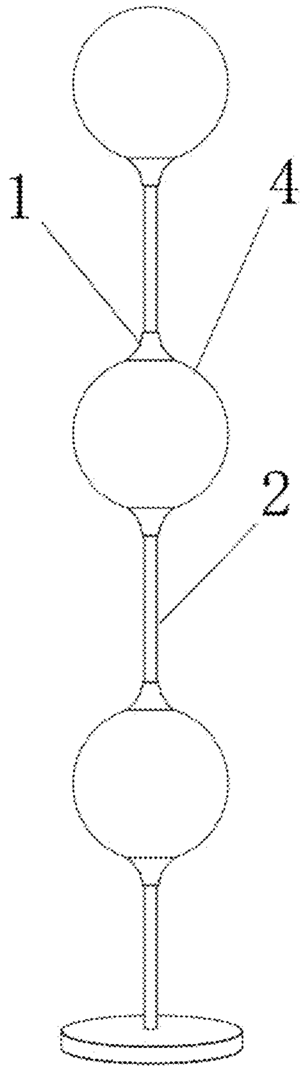
FIG. 18 is a schematic diagram of the string light that is rigidly supported according to one embodiment of the present disclosure.

It should be noted that, as shown in FIG. 18, each wire 2 may be a rigid wire 2, so as to form a string light that is rigidly connected. A sleeve disposed on a tail end of the string light is connected to a base, the string light supports on ground or hangs on the ceiling. A shape of each lampshade 4 is spherical, elliptical, or polygonal.

Figure 19:
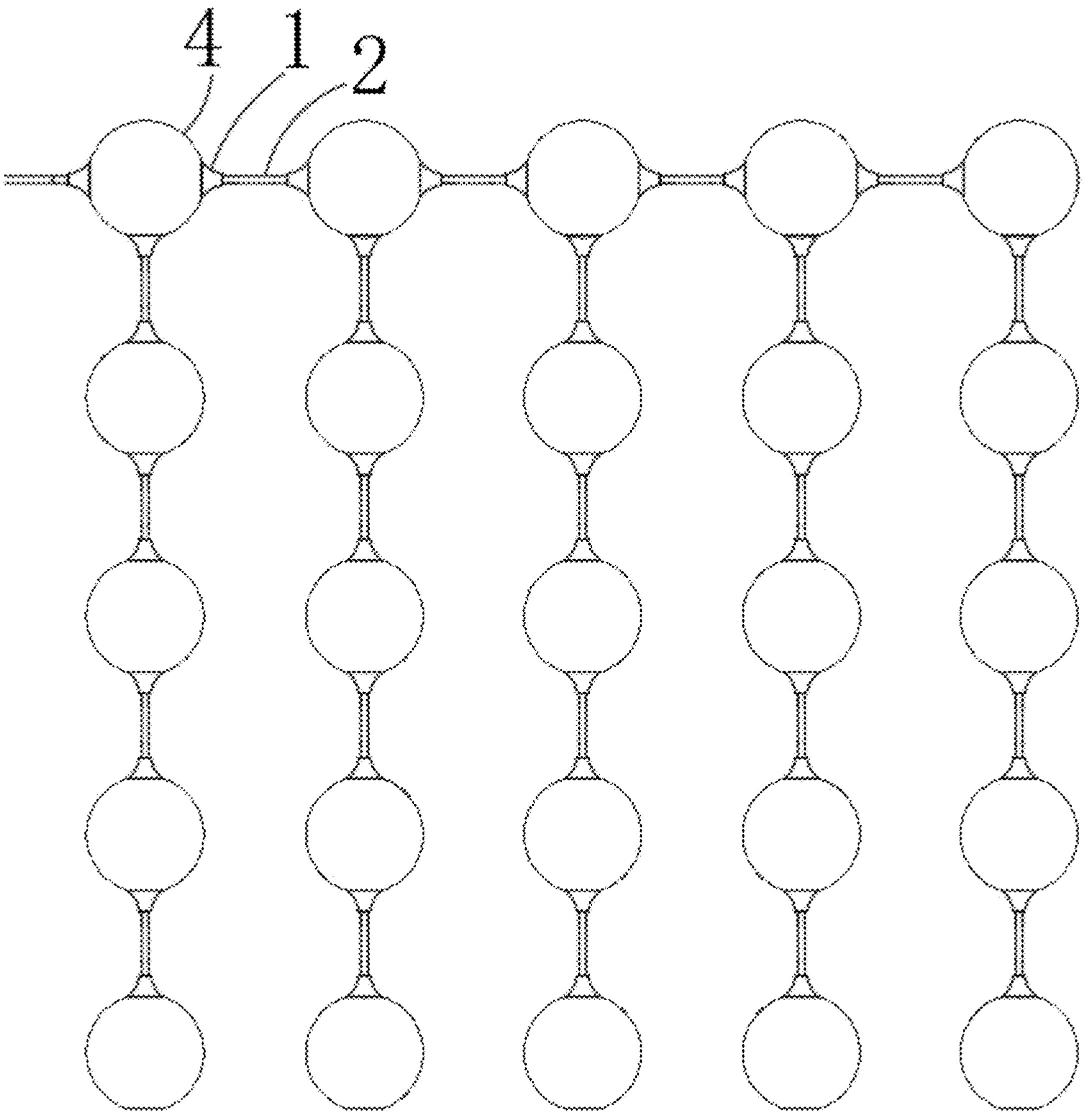
FIG. 19 is a schematic diagram of a curtain light according to one embodiment of the present disclosure.

As shown in FIG. 19, the present disclosure further provides a curtain light. The curtain light comprises string lights mentioned above. Each lampshade 4 defines three openings, and each light-emitting body comprises three power connecting plugs. The three openings of each lampshade are connected with the light body connecting structures to form the curtain light, where the light body connecting structures thereof are electrically connected to the light-emitting bodies thereof.

The above description of the disclosed embodiments enables those skilled in the art to implement or use the present disclosure. A variety of modifications to these embodiments are apparent to those skilled in the art, and general principles defined in the specification can be implemented in other embodiments without departing from the spirit or scope of the present disclosure. Thus, the present disclosure should not be limited to the embodiments disclosed herein, and should be subject to the widest scope consistent with the principles and novel features disclosed herein.

What is claimed is:

1. A light body connecting structure, configured to be mounted on a lampshade, the light body connecting structure comprising: a wiring terminal and a wire;

wherein the wiring terminal comprises a terminal body and at least one wiring plug; at least one mounting groove is defined in a first end of the terminal body; the first end of the terminal body is an end configured to be mounted with the lampshade; the at least one wiring plug is fixedly disposed in the at least one mounting groove; the wire passes through a second end of the terminal body and is electrically connected with the at least one wiring plug; the second end is opposite to the first end; the terminal body is configured to be detachably connected to the lampshade; the at least one wiring plug is configured to be aligned with an opening of the lampshade; and the wiring terminal further comprises a connecting piece configured to be matched with the opening of the lampshade; a first end of the connecting piece is connected with the first end of the terminal body; the at least one mounting groove of the terminal body penetrates the connecting piece; outer threads are disposed on an outer side of the connecting piece; the outer threads are configured to be matched with the opening of the lampshade; the at least one wiring plug comprises a rotatable plug.

2. The light body connecting structure according to claim 1, wherein the at least one wiring plug comprise two wiring plugs; the two wiring plugs comprise a positive plug and a negative plug; the wire comprises a positive electrode and a negative electrode, the positive electrode is electrically connected to the positive plug, and the negative electrode is electrically connected to the negative plug; the at least one mounting groove comprises two mounting grooves; the positive plug is received in one of the two mounting grooves, and the negative plug is received in the other one of the two mounting grooves.

3. The light body connecting structure according to claim 2, wherein the terminal body is in a frustum shape; countersunk holes are defined in two sides of the terminal body, the countersunk holes are configured to receive bolts to enable the terminal body to screw with the opening of the lampshade.

4. The light body connecting structure according to claim 1, wherein the terminal body, the at least one wiring plug, and the connecting piece are integrally formed by injection molding.

5. The light body connecting structure according to claim 1, wherein hooking pieces are disposed on an outer end of the connecting piece and are configured to be screwed into the opening of the lampshade; a hooking end of each of the hooking pieces protrudes with respect to the outer threads of the connecting piece, the hooking end of each of the hooking pieces is configured to hook on an outer side of an inner port of the opening.

6. A light body, comprising:

a light-emitting body, a lampshade, and at least one light body connecting structures mounted on the lampshade;

wherein, each of the at least one light body connecting structures comprises: a wiring terminal and a wire;

the wiring terminal comprises a terminal body and at least one wiring plug; a size of the terminal body is greater than a size of an opening of the lampshade; at least one mounting groove is defined in a first end of the terminal body; the first end of the terminal body is an end configured to be mounted with the lampshade; the at least one wiring plug is fixedly disposed in the at least one mounting groove; the wire passes through a second end of the terminal body and is electrically connected with the at least one wiring plug; the second end is opposite to the first end; the terminal body is detachably connected to the lampshade; when the terminal body is connected to the lampshade, the at least one wiring plug is aligned with the opening of the lampshade;

wherein the light-emitting body comprises a light-emitting piece and at least one power connecting plug; the at least one power connecting plug is fixedly disposed on the light-emitting piece; the at least one wiring plug is matched with the at least one power connecting plug;

wherein the lampshade comprises a lampshade body; an accommodating cavity is defined in the lampshade body, at least one opening is defined in the lampshade body; the at least one opening is communicated with the accommodating cavity; the light-emitting body is capable of being placed into the accommodating cavity from the at least one opening; a quantity of the at least one power connecting plug disposed on the light-emitting piece is matched with a quantity of the at least one opening of the lampshade;

wherein the at least one opening of the lampshade body is connected with the at least one light body connecting structure; the light-emitting body is arranged in the lampshade, and the at least one power connecting plug of the light-emitting body is plugged into the at least one light body connecting structure, so that the light-emitting body is fixedly arranged in the lampshade and is electrically connected with the at least one light body connecting structure.

7. A string light, comprising at least two light bodies according to claim 6 and a connecting wire, wherein the at least one light body connecting structure of each of the at least two light bodies is connected to the at least one light body connecting structure of an adjacent light body of the at least two light bodies through the connecting wire, the at least two light bodies are connected in series to form the string light.

8. The light body according to claim 6, wherein the at least one power connecting plug comprises two power connecting plugs, the two power connecting plugs are respectively disposed on two ends of the light-emitting piece; the two power connecting plugs comprise a first power connecting plug disposed on a first end of the light-emitting body and a second power connecting plug disposed on a second end of the light-emitting body, a length of the light-emitting body from the first power connecting plug disposed on the first end of the light-emitting body to the second power connecting plug disposed on the second end of the light-emitting body is greater than a length of the lampshade, each of the two power connecting plugs has an exposed portion that is exposed outside the lampshade, the exposed portion of each of the two power connecting plugs is plugged into one corresponding light body connecting structure of the light body connecting structures.

9. The light body according to claim 6, wherein the lampshade body comprises at least one stepped groove; the at least one opening is defined in a middle of the at least one stepped groove; a size of the at least one stepped groove is matched with the terminal body of the at least one light body connecting structure; an outer end of the at least one opening defines a chamfer; inner threads are disposed on the at least one opening; the inner threads of the at least one opening are matched with the connecting piece of the at least one light body connecting structure.

10. The light body according to claim 6, wherein the light-emitting piece comprises a circuit board and lamp beads uniformly distributed on the circuit board.

* * * * *